United States Patent
Ito

(10) Patent No.: US 12,382,175 B2
(45) Date of Patent: Aug. 5, 2025

(54) CONTROL APPARATUS, OPTICAL APPARATUS, AND CONTROL METHOD

(71) Applicant: CANON KABUSHIKI KAISHA, Tokyo (JP)

(72) Inventor: Rumi Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 18/179,438

(22) Filed: Mar. 7, 2023

(65) Prior Publication Data

US 2023/0292007 A1    Sep. 14, 2023

(30) Foreign Application Priority Data

Mar. 11, 2022 (JP) ................. 2022-038676
Feb. 16, 2023 (JP) ................. 2023-022055

(51) Int. Cl.
*H04N 23/68* (2023.01)
(52) U.S. Cl.
CPC ......... *H04N 23/687* (2023.01); *H04N 23/683* (2023.01)
(58) Field of Classification Search
CPC .. H04N 23/687; H04N 23/683; H04N 23/663; H04N 23/6812
See application file for complete search history.

(56) References Cited

U.S. PATENT DOCUMENTS 9,838,605 B2    12/2017 Tsuchiya
10,999,509 B2 *  5/2021 Ito ........................... G03B 5/00
11,146,729 B2   10/2021 Nadamoto
2020/0329199 A1 * 10/2020 Nomura ............. H04N 23/6812

FOREIGN PATENT DOCUMENTS

JP    5197126 B2    5/2013
JP    6410431 B2   10/2018

OTHER PUBLICATIONS

Extended European search report issued in European Appln. No. 23161169.0, mailed on Oct. 25, 2023.
Extended European Search Report issued in European Appln. No. 25151286.9, mailed May 16, 2025.

* cited by examiner

*Primary Examiner* — Lin Ye
*Assistant Examiner* — Steven Daniel Barry
(74) *Attorney, Agent, or Firm* — ROSSI, KIMMS & McDOWELL LLP

(57) ABSTRACT

A control apparatus is configured to control, based on a shake amount, driving of a first image stabilizing unit that moves a correction optical system and a second image stabilizing unit that moves an image sensor. The control apparatus acquires first and second information about an image blur residue relative to a moving amount of the correction optical system and the image sensor, respectively, and third and fourth information about a maximum image stabilizable amount of the first and second image stabilizing units, respectively, and a setting unit configured to set a correction ratio between the first image stabilizing unit and the second image stabilizing unit to a first ratio based on the first and second information, and a second ratio based on the third and fourth information, and switches the correction ratio according to the shake amount.

12 Claims, 8 Drawing Sheets

CONTROL APPARATUS, OPTICAL APPARATUS, AND CONTROL METHOD

BACKGROUND

Technical Field

One of the aspects of the disclosure relates to a control apparatus that controls an image stabilizing (which may be simply referred to as IS) function that optically reduces (or corrects) image blur during imaging.

Description of the Related Art

An optical image stabilization method that optically corrects image blur caused by shake (camera shake) of the image pickup apparatus is classified into a lens shift method (optical-system IS or simply referred to as OIS hereinafter) that moves a correction lens relative to an optical axis, and a sensor shift method (image-sensor IS or simply referred to as IIS hereinafter) that moves an image sensor relative to the optical axis. Japanese Patent No. (JP) 6410431 discloses a camera system that performs optical image stabilization using both OIS and IIS. JP6410431 discloses a method of providing good image stabilizing performance for a larger camera shake of the entire camera system by properly setting a correction ratio between OIS and IIS.

An imaging optical system that forms an object image on the image sensor generally has distortion. Therefore, when the position (orientation) of the image pickup apparatus changes due to the camera shake, image point moving amounts are mutually different between a central portion (near the optical axis) and a peripheral portion due to the influence of the distortion.

In addition, eccentric distortion occurs in a case where the correction lens is shifted (decentered) by OIS. Therefore, OIS also causes a difference in the image point moving amount between the central portion and the peripheral portion. On the other hand, even if the image sensor is moved by IIS, the image point moving amount in the central portion is the same as that in the peripheral portion. Therefore, if IIS is performed in accordance with the image point moving amount in the central portion caused by the camera shake, an image blur remains in the peripheral portion. Furthermore, when the image point moving amount due to the distortion caused by the camera shake is different from that due to the eccentric distortion in OIS, even if the correction is performed in accordance with the image point moving amount in the central area, an appropriate correction cannot be performed in the peripheral area. Therefore, even in a case where both OIS and IIS are used, it is difficult to satisfactorily correct image blur both at the central portion and at the peripheral portion.

SUMMARY

One of the aspects of the embodiment provides a control apparatus and an optical apparatus having the control apparatus, each of which can perform proper image stabilization according to a shake amount using both OIS and IIS.

A control apparatus according to one aspect of the disclosure is configured to control, based on a detected shake amount, driving of a first image stabilizing unit for image stabilization by moving a correction optical system that constitutes at least part of an imaging optical system and a second image stabilizing unit for image stabilization by moving an image sensor configured to capture an object image formed by the imaging optical system. The control apparatus includes at least one processor, and a memory coupled to the at least one processor, the memory having instructions that, when executed by the processor, perform operations as an acquiring unit configured to acquire first information about an image blur residue relative to a moving amount of the correction optical system, second information about an image blur residue relative to a moving amount of the image sensor, third information about a maximum image stabilizable amount of the first image stabilizing unit, and fourth information about a maximum image stabilizable amount of the second image stabilizing unit, and a setting unit configured to set a correction ratio between the first image stabilizing unit and the second image stabilizing unit. The setting unit sets, as the correction ratio, a first ratio based on the first information and the second information, and a second ratio based on the third information and the fourth information. The setting unit switches between the first ratio and the second ratio according to the shake amount. An image pickup apparatus having the above control apparatus and a control method corresponding to the above control apparatus also constitute another aspect of the disclosure.

A control apparatus according to another aspect of the disclosure is configured to control, based on a detected shake amount, driving of a first image stabilizing unit for image stabilization by moving a correction optical system that constitutes at least part of an imaging optical system and a second image stabilizing unit for image stabilization by moving an image sensor configured to capture an object image formed by the imaging optical system. The control apparatus includes at least one processor, and a memory coupled to the at least one processor, the memory having instructions that, when executed by the processor, perform operations as a control unit configured to provide image stabilization by switching between first image stabilizing control configured to move the first image stabilizing unit in an image stabilizing direction and to move the second image stabilizing unit in a direction opposite to the image stabilizing direction, and second image stabilizing control configured to move the first image stabilizing unit and the second image stabilizing unit in the image stabilizing correcting direction. The control unit switches between the first image stabilizing control and the second image stabilizing control according to the shake amount. An image pickup apparatus having the above control apparatus and a control method corresponding to the above control apparatus also constitute another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a description will be given of embodiments according to the disclosure.

Prior to a description of the embodiments, a comparative example (base technology examples) for the embodiments will be described.

Figure 1:
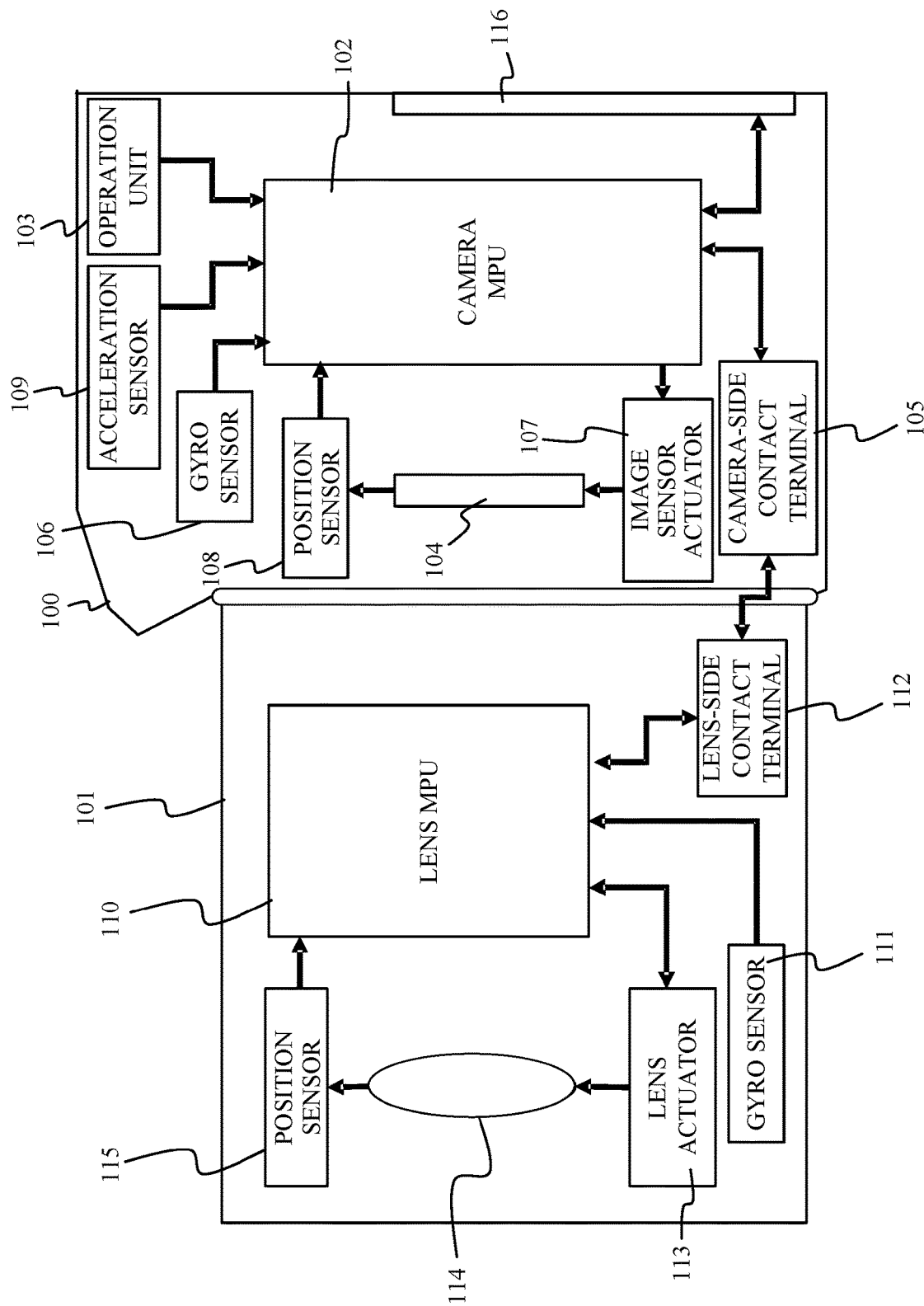
FIG. 1 is a block diagram illustrating a configuration of a camera system according to the comparative example and embodiment.

FIG. 1 illustrates a configuration of an imaging system according to the comparative example. The imaging system includes an interchangeable lens 101 as a first optical apparatus and a camera body 100 as a second optical apparatus to which the interchangeable lens 101 is detachably and communicatively connected. The camera body 100 includes a camera MPU 102, an operation unit 103, an image sensor 104, a camera-side contact terminal 105, a camera-side gyro sensor 106, an acceleration sensor 109, and a rear display 116.

The camera MPU 102 is a controller that governs the overall control of the camera body 100 and the interchangeable lens 101, and controls a variety of operations such as auto-exposure (AE), autofocus (AF), and imaging according to inputs from the operation unit 103, which will be described below. The camera MPU 102 communicates various commands and information with the lens MPU 110 through the camera-side contact terminal 105 and a lens-side contact terminal 112 provided on the interchangeable lens 101. The camera-side contact terminal 105 and the lens-side contact terminal 112 also include power terminals for supplying power from the camera body 100 to the interchangeable lens 101.

The operation unit 103 includes a mode dial for setting a variety of imaging modes, a release button for instructing an imaging preparation operation and an imaging start, and the like. When the release button is half-pressed, a first switch (SW1) is turned on, and when the release button is fully pressed, a second switch (SW2) is turned on. When SW1 is turned on, AE and AF are performed as the imaging preparation operation, and when SW2 is turned on, the AE setting is finalized, AF is stopped, and the like, and an instruction to start imaging (exposure) is issued (SW2-1 is turned on). A predetermined time after the instruction is issued, actual exposure is started (SW2-2 is turned on). SW2-1 and SW2-2 are turned off when the set exposure time has passed and the imaging has ended. The turning on and off states of SW1, SW2-1, and SW2-2 are notified from the camera MPU 102 to the lens MPU 110 through communication.

The image sensor 104 includes a photoelectric conversion element such as a CCD sensor or a CMOS sensor, and photoelectrically converts an object image formed by an imaging optical system, which will be described below, to generate an imaging signal. The camera MPU 102 generates a video signal using the imaging signal from the image sensor 104.

The camera-side gyro sensor 106 is a shake sensor that detects angular shake (camera shake) applied to the camera body 100 due to camera shake or the like and outputs an angular velocity signal as a camera shake detection signal. The camera MPU 102 drives an image sensor actuator 107 based on the angular velocity signal and an IIS correction ratio, which will be described below, to move the image sensor 104 in a direction orthogonal to the optical axis of the imaging optical system, which will be described below. Thereby, image blur caused by camera shake is reduced (or corrected). At this time, the camera MPU 102 performs feedback control over the image sensor actuator 107 so that the position of the image sensor 104 detected by an image sensor position sensor 108 (or a moving amount from a position on the optical axis as a moving center) approaches the target position. Thereby, image stabilization that moves the image sensor 104, that is, IIS is performed.

The acceleration sensor 109 is used to detect the orientation of the camera body 100, and to detect shift shake, which is difficult to detect with the camera-side gyro sensor 106, among camera shakes. The rear display 116 as a display unit displays an image corresponding to the video signal generated by the camera MPU 102 using the imaging signal from the image sensor 104. Before imaging is made, the user can observe a displayed image as a finder image (live-view image). After imaging is made, a still or moving image for recording generated by imaging can be displayed on the rear display 116. The term "imaging" used in this description means imaging for recording.

The interchangeable lens 101 includes the unillustrated imaging optical system, the lens MPU 110, the lens-side contact terminal 112, and a lens-side gyro sensor 111. The lens-side gyro sensor 111 is a shake sensor that detects angular shake (lens shake) of the interchangeable lens 101 and outputs a lens shake detection signal as an angular velocity signal.

The lens MPU 110 drives a lens actuator 113 based on a lens shake detection signal and an OIS correction ratio, which will be described below, to move a correction lens 114 as a correction optical system constituting at least part of the imaging optical system, in a direction orthogonal to the optical axis of the imaging optical system. At this time, the lens MPU 110 performs feedback control over the lens actuator 113 so that the position of the correction lens 114 detected by a lens position sensor 115 (or a moving amount from a position on the optical axis as a moving center) approaches the target position. Accordingly, image stabilization that moves the correction lens 114, that is, OIS is performed.

The lens actuator 113 and correction lens 114 correspond to the first image stabilizing unit, and the image sensor actuator 107 and image sensor 104 correspond to the second image stabilizing unit.

Figure 2:
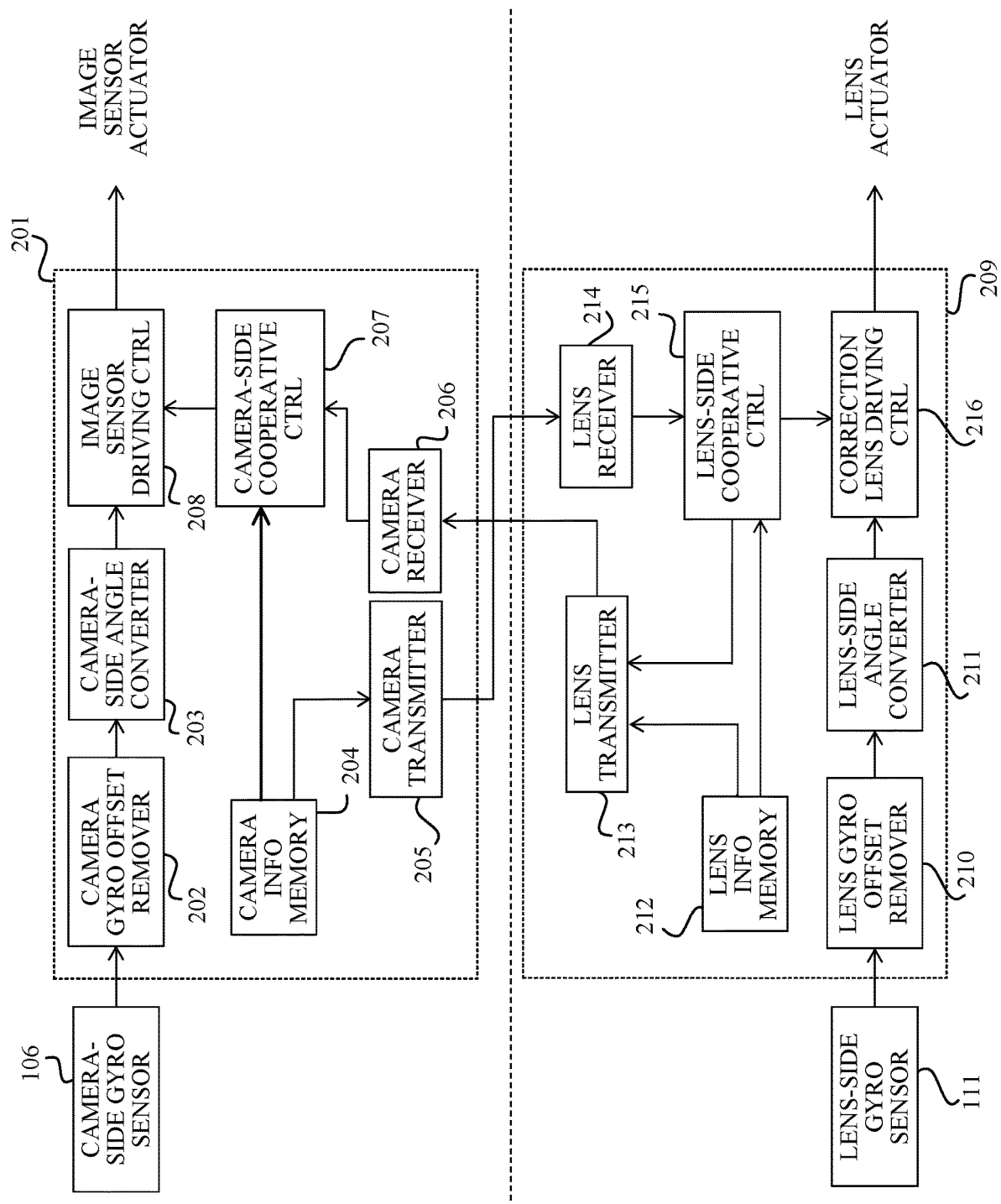
FIG. 2 is a block diagram illustrating configurations of OIS and IIS according to the comparative example and embodiment.

FIG. 2 illustrates a configuration of an image stabilizing system in an imaging system according to the comparative example. The image stabilizing system includes a lens IS control unit 209 that controls the entire IS system including OIS and IIS as an IS control apparatus (control apparatus), and a camera IS control unit 201 that controls IIS together with the OIS control unit 209. The lens IS control unit 209 is provided in the lens MPU 110, and the camera IS control unit 201 is provided in the camera MPU 102. Instead of the lens IS control unit 209, the camera IS control unit 201 may serve as the IS control apparatus (control apparatus) to control the entire IS system.

In the camera IS control unit 201, a camera gyro offset remover 202 removes an offset component from the angular velocity signal detected by the camera-side gyro sensor 106 mounted on the camera body 100. A camera-side angle converter 203 converts an angular velocity signal output from the camera gyro offset remover 202 into an angle signal.

Figure 8:
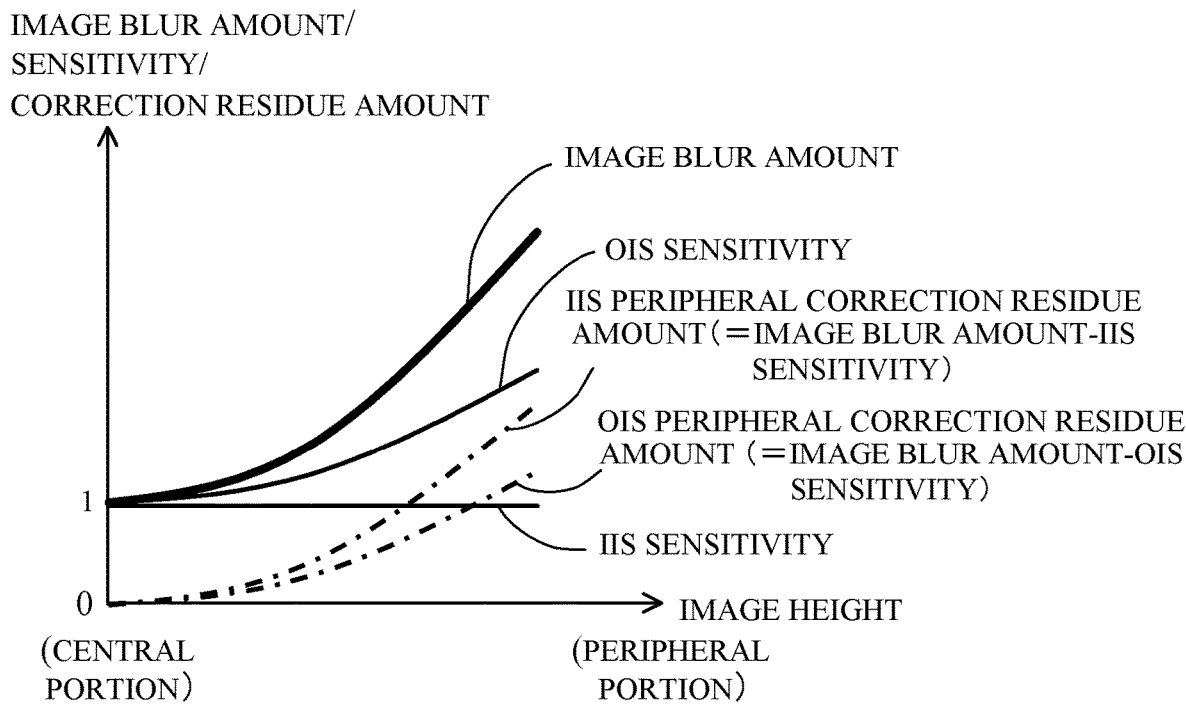
FIG. 8 illustrates OIS and IIS sensitivities according to the comparative example and embodiment.

A camera information memory 204 stores IIS driving information and IIS sensitivity information. The IIS driving information is information about driving such as the maximum driving amount of the image sensor 104. The IIS sensitivity information is an image point moving amount for each image height from the central portion to the peripheral portion on the imaging plane (referred to as an image point moving amount hereinafter) relative to a predetermined moving amount (unit moving amount) of the image sensor 104, that is, information about image stabilizing sensitivity (IIS sensitivity). FIG. 8 illustrates the IIS sensitivity at each image height, an image blur amount that is the image point moving amount at each image height when the camera shake occurs such that the image point moving amount at the central portion is 1, and an IIS peripheral correction residue amount that is an image blur residue amount to be corrected at each image height on the peripheral side further than the central portion when the image sensor 104 is driven to correct the image blur in the central portion. In FIG. 8, the image blur amount increases as the image height increases from the central portion. The IIS sensitivity is constant regardless of the image height. As a result, the IIS peripheral correction residue amount obtained by subtracting the IIS sensitivity from the image blur amount increases as the image height increases from the central portion.

The IIS sensitivity information may be information indicating the IIS sensitivity itself as illustrated in FIG. 8, or may be information that can be converted into the IIS sensitivity or a function for calculating the IIS sensitivity. The IIS sensitivity information may be information indicating the IIS peripheral correction residue amount illustrated in FIG. 8. Furthermore, the IIS sensitivity information may be information indicating the IIS correction ratio described later. Since the IIS peripheral correction residue amount and the IIS correction ratio are determined by the IIS sensitivity, both of them are information related to the IIS sensitivity.

The IIS sensitivity information may be information indicating an image stabilization residue amount (referred to as an IIS peripheral correction residue amount hereinafter) to be corrected for each image height on the peripheral side of the central portion in a case where the image sensor 104 is driven to correct a predetermined image blur amount in the central portion, as illustrated in FIG. 8. Since the IIS peripheral correction residue amount is determined by the IIS sensitivity, it is information about the IIS sensitivity. The IIS driving information and IIS sensitivity information are transmitted to the lens IS control unit 209 via a camera transmitter 205.

The camera-side cooperative control unit 207 receives and stores IIS correction ratio information, which will be described below, from the lens IS control unit 209 via a camera receiver 206. An image sensor driving control unit 208 generates an IIS driving signal for driving the image sensor 104 according to the angle signal from the camera-side angle converter 203 and the IIS correction ratio output from the camera-side cooperative control unit 207. The image sensor actuator 107 that receives the IIS driving signal drives the image sensor 104 in a direction orthogonal to the optical axis.

In the lens IS control unit 209, a lens gyro offset remover 210 removes an offset component from the angular velocity signal detected by the lens-side gyro sensor 111 mounted on the interchangeable lens 101. A lens-side angle converter 211 converts the angular velocity signal output from the lens gyro offset remover 210 into an angle signal.

A lens information memory 212 stores OIS driving information and OIS sensitivity information. The OIS driving information is information about driving such as the maximum driving amount of the correction lens 114. The OIS sensitivity information is information about the image point moving amount for each image height from the central portion to the peripheral portion on the imaging plane relative to a predetermined moving amount (unit moving amount) of the correction lens 114, that is, image stabilization sensitivity (OIS sensitivity). FIG. 8 illustrates the OIS sensitivity at each image height, the image blur amount described above, and an OIS peripheral correction residue amount that is an image blur residue amount to be corrected at each image height on the peripheral side further than the central portion when the image sensor 104 is driven to correct the image blur in the central portion. In FIG. 8, the OIS sensitivity increases as the image height increases from the central portion. As a result, the OIS peripheral correction residue amount obtained by subtracting the OIS sensitivity from the image blur amount increases as the image height increases from the central portion, but the OIS peripheral correction residue amount becomes smaller than the IIS peripheral correction residue amount.

The OIS sensitivity information may be information indicating the OIS sensitivity itself as illustrated in FIG. 8, or may be information that can be converted into the OIS sensitivity or a function for calculating the OIS sensitivity. The OIS sensitivity information may be information indicating the OIS peripheral correction residue amount illustrated in FIG. 8. Furthermore, the OIS sensitivity information may be information indicating the OIS correction ratio described later. Since the OIS peripheral correction residue amount and the OIS correction ratio are determined by the OIS sensitivity, both of them are information related to the OIS sensitivity.

The OIS sensitivity information may be information indicating an image stabilization residue amount (referred to as an OIS peripheral correction residue amount hereinafter) to be corrected for each image height on the peripheral side of the central portion in a case where the correction lens 114 is driven to correct a predetermined image blur amount in the central portion. Since the OIS peripheral correction residue amount is determined by the OIS sensitivity, it is information about the OIS sensitivity.

The OIS sensitivity information and the IIS sensitivity information may be different information depending on a zoom state of the imaging optical system and a position of a focus lens.

A lens-side cooperative control unit (an acquiring unit and a setting unit) 215 reads the OIS driving information and OIS sensitivity information from the lens information memory 212. The lens-side cooperative control unit 215 receives the IIS driving information and IIS sensitivity information from the camera IS control unit 201 via the lens receiver 214. The lens-side cooperative control unit 215 calculates and determines the OIS correction ratio and the IIS correction ratio, which are ratios of the image blur amounts to be respectively corrected by OIS and IIS, on the basis of the OIS drive information and the IIS drive information, and the OIS peripheral correction residue amount (first information) and the IIS peripheral correction residue amount (second information) respectively calculated from the image blur amount and the OIS sensitivity information and IIS sensitivity information. The lens-side cooperative control unit 215 outputs the determined OIS correction ratio to a correction lens driving control unit 216. The lens-side cooperative control unit 215 transmits information on the determined IIS correction ratio to the camera IS control unit 201 (camera-side cooperative control unit 207) via a lens transmitter 213.

The correction lens driving control unit 216 generates an OIS driving signal for driving the correction lens 114 according to the angle signal from the lens-side angle converter 211 and the OIS correction ratio from the lens-side cooperative control unit 215. Upon receiving the OIS driving signal, the lens actuator 113 drives the correction lens 114 in the direction orthogonal to the optical axis.

The above operation of the image stabilizing system may be normally performed after the imaging system is powered on, or may be performed only during imaging. During a non-imaging period after the power is turned on, either IIS or OIS may be driven, or the operation of the image stabilizing system may be stopped.

Figure 3:
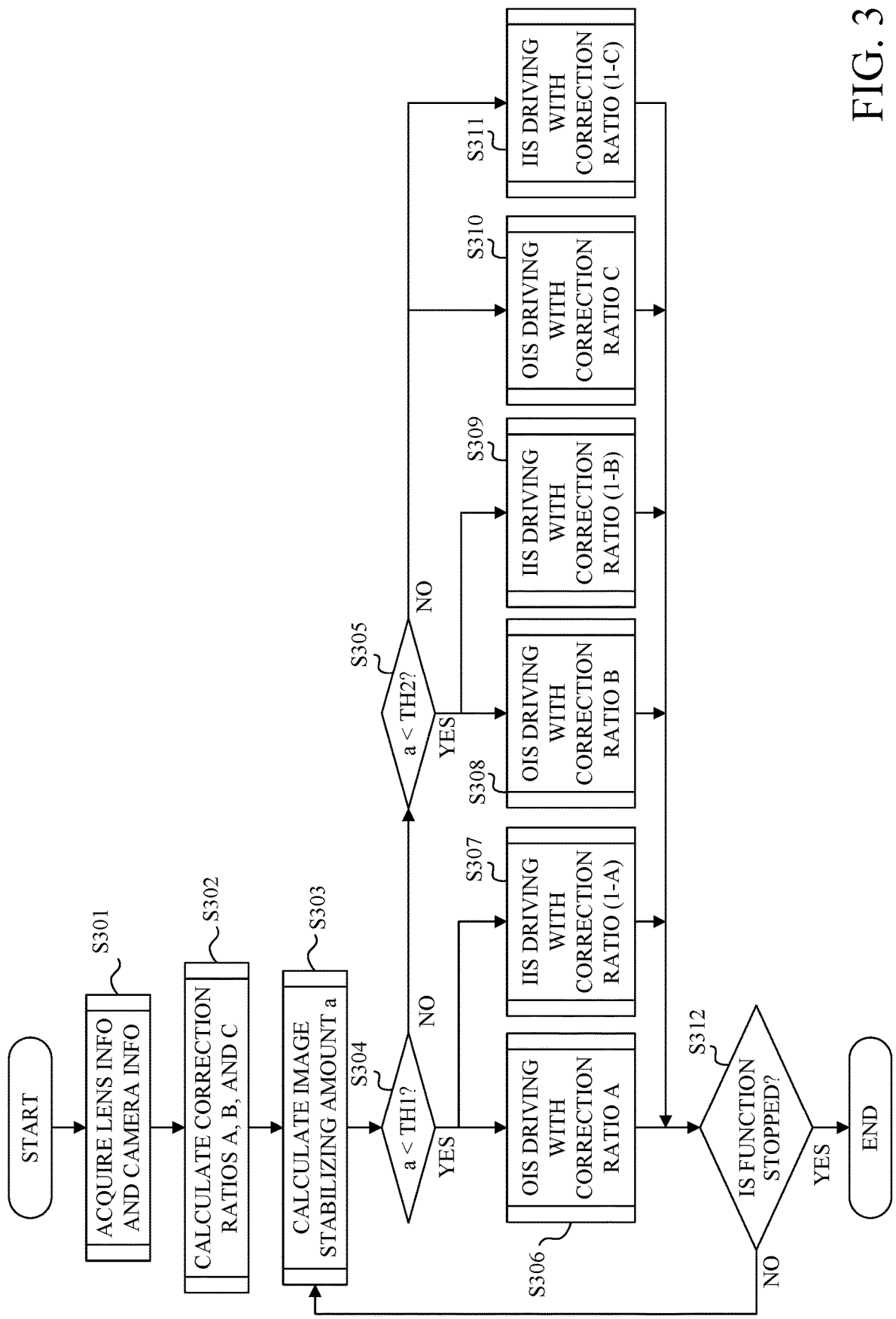
FIG. 3 is a flowchart illustrating image stabilization control processing according to the comparative example and embodiment.

A flowchart in FIG. 3 illustrates image stabilizing control processing (image stabilizing control method) performed by the lens IS control unit 209 (lens-side cooperative control unit 215) and the camera IS control unit 201 (camera-side cooperative control unit 207). The lens IS control unit 209 and the camera IS control unit 201 as computers execute this processing according to the program. S in the figure stands for the step.

After the imaging system is powered on and the camera MPU 102 and lens MPU 110 perform initial operations, the lens IS control unit 209 and camera IS control unit 201 start this processing.

First, in step S301, the lens IS control unit 209 reads the OIS driving information and the OIS sensitivity information from the lens information memory 212 and receives the IIS driving information and the IIS sensitivity information from the camera IS control unit 201.

Next, in step S302, the lens IS control unit 209 calculates OIS correction ratios A, B, and C and IIS correction ratios (1−A), (1−B), and (1−C). The OIS correction ratio and the IIS correction ratio are ratios of the image stabilizing amount by OIS and the image stabilizing amount by IIS in the image stabilizing amount by the entire image stabilizing system consisting of OIS and IIS. The OIS correction ratio may be selected between 0 and 1, or may be a value equal to or larger than 0. In a case where the OIS correction ratio is larger than 1, OIS overcorrects image blur, and IIS returns the overcorrection in accordance with a negative IIS correction ratio. A specific example of the OIS correction ratio will be described below.

Each of the OIS correction ratio A and the IIS correction ratio (1−A) correspond to a first ratio, and each of the OIS correction ratio C and the IIS correction ratio (1−C) correspond to a second ratio. Each of the OIS correction ratio B and the IIS correction ratio (1−B) correspond to a third ratio.

Next, in step S303, the lens IS control unit 209 calculates an image stabilizing amount "a" by the entire IS system. More specifically, the lens IS control unit 209 calculates the image stabilizing amount "a" from the angle signal from the lens-side angle converter 211. At this time, the camera IS control unit 201 also calculates the image stabilizing amount "a" from the angle signal from the camera-side angle converter 203.

Next, in step S304, the lens IS control unit 209 compares the absolute value of the image stabilizing amount "a" with a threshold (first predetermined value) TH1. In a case where the absolute value of the image stabilizing amount "a" is smaller than the threshold TH1, the lens IS control unit 209 calculates a driving amount of the correction lens 114 (referred to as an OIS driving amount hereinafter) from the image stabilizing amount "a" and the OIS correction ratio A in step S306, and generates an OIS driving signal corresponding to the OIS driving amount. Thereby, OIS with the OIS correction ratio A is performed. At this time, the lens IS control unit 209 also transmits the IIS correction ratio (1−A) to the camera IS control unit 201. In step S307, the camera IS control unit 201 calculates a driving amount of the image sensor 104 (referred to as an IIS driving amount hereinafter) from the image stabilizing amount "a" and the received IIS correction ratio (1−A) and generates an IIS driving signal corresponding to the IIS driving amount. Thereby, IIS is performed with the IIS correction ratio (1−A).

In a case where the absolute value of the image stabilizing amount "a" is equal to or larger than the threshold TH1 in step S304, the lens IS control unit 209 compares the absolute value of the image stabilizing amount "a" with a threshold (second predetermined value) TH2 in step S305. The threshold TH2 is a value larger than the threshold TH1. In a case where the absolute value of the image stabilizing amount "a" is equal to or larger than the threshold TH2, the lens IS control unit 209 calculates an OIS driving amount from the image stabilizing amount "a" and the OIS correction ratio C in step S310 and generates an OIS driving signal corresponding to the OIS driving amount. Thereby, OIS with the OIS correction ratio C is performed. At this time, the lens IS control unit 209 transmits the IIS correction ratio (1−C) to the camera IS control unit 201. In step S311, the camera IS control unit 201 calculates an IIS driving amount from the image stabilizing amount "a" and the received IIS correction ratio (1−C), and generates an IIS driving signal corresponding to the IIS driving amount. Thereby, IIS with the IIS correction ratio (1−C) is performed.

In a case where the absolute value of the image stabilizing amount "a" is smaller than the threshold TH2 in step S305, the lens IS control unit 209 calculates an OIS driving amount from the image stabilizing amount "a" and the OIS correction ratio B in step S308 and generates an OIS driving signal corresponding to the OIS driving amount. Thereby, OIS with the OIS correction ratio B is performed. At this time, the lens IS control unit 209 transmits the IIS correction ratio (1−B) to the camera IS control unit 201. The camera IS control unit 201 calculates an IIS driving amount from the image stabilizing amount "a" and the received IIS correction ratio (1−B), and generates an IIS driving signal corresponding to the IIS driving amount. Thereby, IIS with the IIS correction ratio (1−B) is performed.

In step S312, the lens IS control unit 209 determines whether or not to stop the operation of the image stabilizing system. More specifically, the operation of the image stabilizing system is stopped in a case where imaging is completed, in a case where the user instructs to stop the operation of the image stabilizing system, in a case where the imaging system (camera body 100) is powered off, or the like. In a case where the operation of the image stabilizing system is to be continued, the processing from step S303 and the subsequent steps are repeated, and in a case where the operation is to be stopped, this processing ends.

A description will now be given of a method of calculating the OIS correction ratios A, B, and C and the IIS correction ratios (1−A), (1−B), and (1−C). A description will now be given of a case where each correction ratio is calculated according to a comparison result between the OIS peripheral correction residue amount Ld and the IIS peripheral correction residue amount Cd described above. However, each correction ratio may be calculated according to the comparison result of the OIS sensitivity and the IIS sensitivity in the peripheral portion.

In a case where the absolute value of the OIS peripheral correction residue amount Ld is smaller than the absolute value of the IIS peripheral correction residue amount Cd, A=1 and C=0 are set. B is set so as to vary between A and C according to the image stabilizing amount "a," for example, as illustrated in equation (1) below.

$$B=(TH2-|a|)/(TH2-TH1) \quad (1)$$

In a case where the absolute value of the IIS peripheral correction residue amount Cd is smaller than the absolute value of the OIS peripheral correction residue amount Ld, A=0 and C=1 are set. B is set so as to vary between A and C according to the image stabilizing amount "a," for example, as illustrated in the following equation (2).

$$B=(|a|-TH1)/(TH2-TH1) \quad (2)$$

Figure 4:
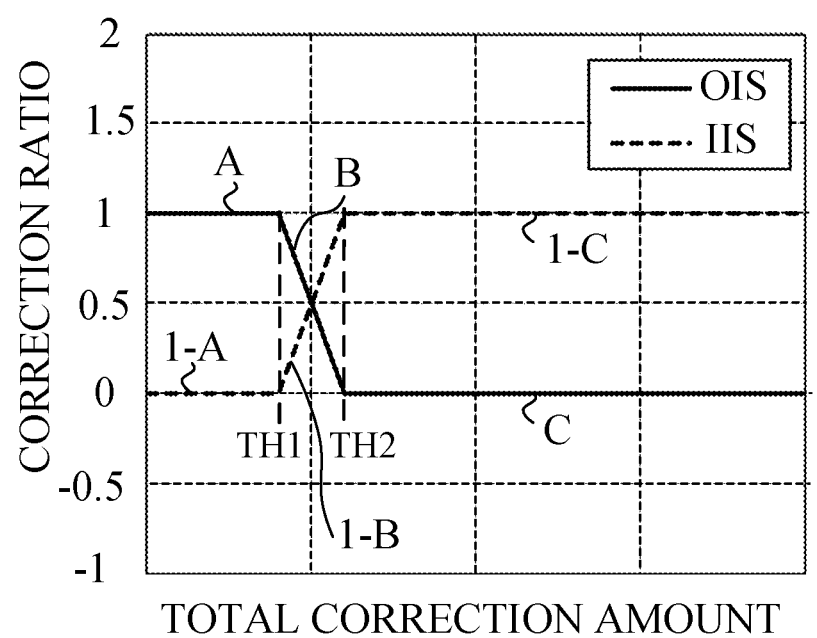
FIG. 4 illustrates an example of a correction ratio between OIS and IIS according to the comparative example.
Figure 5:
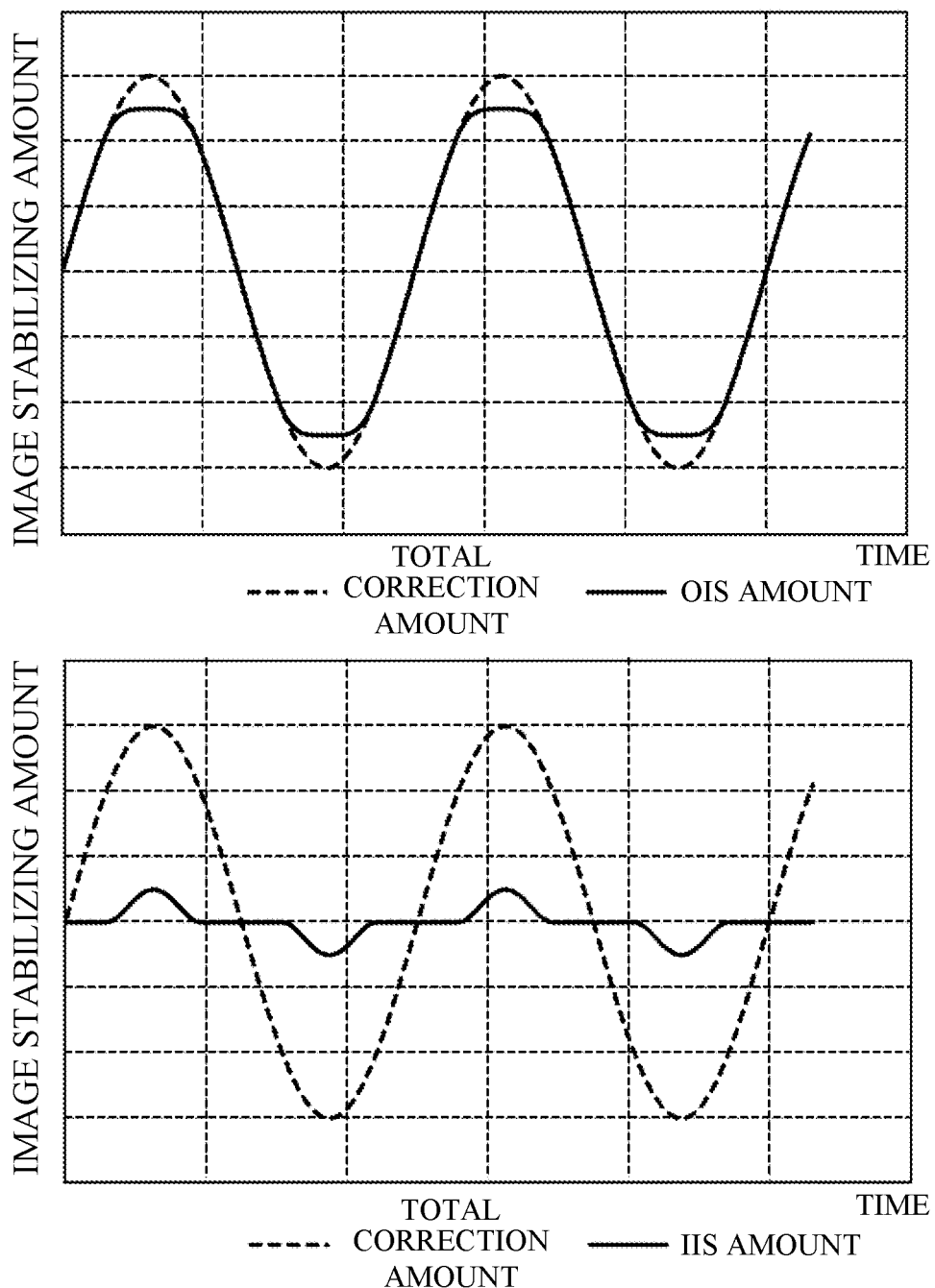
FIG. 5 illustrates an IIS amount and an OIS amount against a total correction amount using the correction ratio illustrated in FIG. 4.

FIG. 4 illustrates the OIS correction ratios A, B, and C and the IIS correction ratio (1−A), (1−B), and (1−C) relative to the image stabilizing amount "a" in a case where the absolute value of the OIS peripheral correction residue amount Ld is smaller than the absolute value of the IIS peripheral correction residue amount Cd. A horizontal axis indicates the image stabilizing amount (total correction amount) "a" in the entire image stabilizing system, and A vertical axis indicates the correction ratio. FIG. 5 illustrates an example of temporal changes in the image stabilizing amount by OIS (OIS amount) and the image stabilizing amount by IIS (IIS amount) against the total correction amount "a" in a case where the IIS correction ratios A, B, and C and the IIS correction ratios (1−A), (1−B), and (1−C) illustrated in FIG. 4 are used. A horizontal axis indicates time, and a vertical axis indicates the image stabilizing amount.

As described above, in a case where the image stabilizing amount (that is, the shake amount of the imaging system) is smaller than the threshold TH1, the comparative example gives preferentially uses one of OIS and IIS which has a smaller peripheral correction residue amount, that is, increases the correction ratio. Thereby, this comparative example can satisfactorily correct image blur in the central portion and reduces the IS residue amount in the peripheral portion. On the other hand, in a case where the image stabilizing amount is equal to or larger than the threshold TH2, the comparative example preferentially uses one of OIS and IIS which has a larger peripheral correction residue amount. Thereby, in a case where a large shake is applied to the imaging system, this comparative example can satisfactorily correct image blur in the central portion. In a case where the image stabilizing amount is equal to or larger than the threshold TH1 and smaller than TH2, this comparative example gradually changes the correction ratio according to the image stabilizing amount, thereby suppressing abrupt operations of OIS and IIS and stabilizing the controllability.

By changing the OIS and IIS correction ratios according to the detected shake amount, this comparative example can perform proper image stabilization for both small and large shake amounts.

A description will now be given of the embodiment of this disclosure. The configurations of the camera body 100, the interchangeable lens 101, the camera IS control unit 201 and the lens IS control unit 209 and the basic part of the image stabilization processing in this embodiment are the same as those in the comparative example.

This embodiment is different from the comparative example in the method of calculating the OIS correction ratios A, B, and C. More specifically, the correction ratio is calculated according to a magnitude correlation between the absolute value of the image stabilizing amount "a" and the threshold TH1, instead of the magnitude correlation of the absolute value of the peripheral correction residue amount as in the comparative example.

The OIS correction ratio A and the IIS correction ratio (1−A) are calculated by the following equations (3).

$$A=Cd/(Cd-Ld)$$

$$1-A=-Ld/(Cd-Ld) \quad (3)$$

Thus, the OIS correction ratio A is calculated from a ratio between the OIS or IIS peripheral correction residue amount (that is, a value relating to the image blur residue at the peripheral image height) and a difference between the OIS and IIS peripheral correction residue amounts. Thereby, OIS and IIS can be used to correct image blur in the central portion, and the OIS can be used to correct image blur in the peripheral portion.

The OIS correction ratio C is set to 0 in a case where an IS residue amount correctable by OIS with the OIS correction ratio A becomes 0 faster than an IS residue amount correctable by IIS with the IIS correction ratio (1−A), otherwise C is set to 1. That is, the following equations are established:

If $L\alpha max/A < C\alpha max/(1-A)$, then $C=0$

If $L\alpha max/A > C\alpha max/(1-A)$, then $C=1$ where $L\alpha max$ is the maximum image stabilizable amount by OIS (referred to as a maximum OIS amount hereinafter), and $C\alpha max$ is the maximum image stabilizable amount by IIS (referred to as a maximum IIS amount hereinafter).

Information about the maximum OIS amount $L\alpha max$ (third information) and information about the maximum IIS amount $C\alpha max$ (fourth information) are stored in the lens information memory 212 and the camera information memory 204, respectively. These pieces of information may be information indicating the maximum IS amount itself, information that can be converted into the maximum IS amount, or information indicating the maximum drivable amounts of OIS and IIS.

The lens IS control unit 209 compares the maximum OIS amount Lαmax obtained from the information read out of the lens information memory 212 and the maximum IIS amount Cαmax obtained from the information received from the camera IS control unit 201. Then, the OIS correction ratio C and the IIS correction ratio (1−C) are determined based on the comparison result.

The OIS correction ratio B is set with equation (4), for example, so that it changes between A and C according to the image stabilizing amount "a."

$$B=(C-A)\times(|a|-TH1)/(TH2-TH1) \quad (4)$$

Figure 6A:
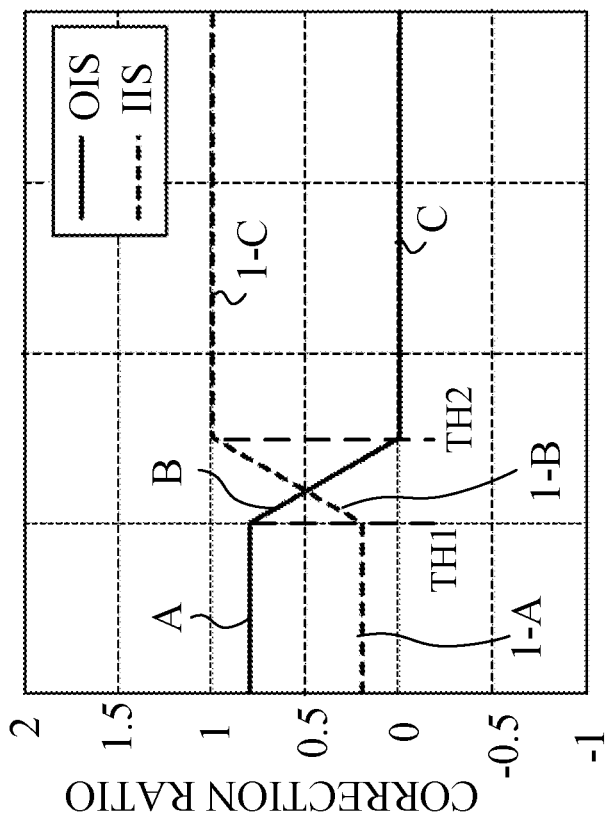
FIGS. 6A and 6B illustrate an example of the correction ratio between IIS and OIS according to this embodiment.
Figure 6B:
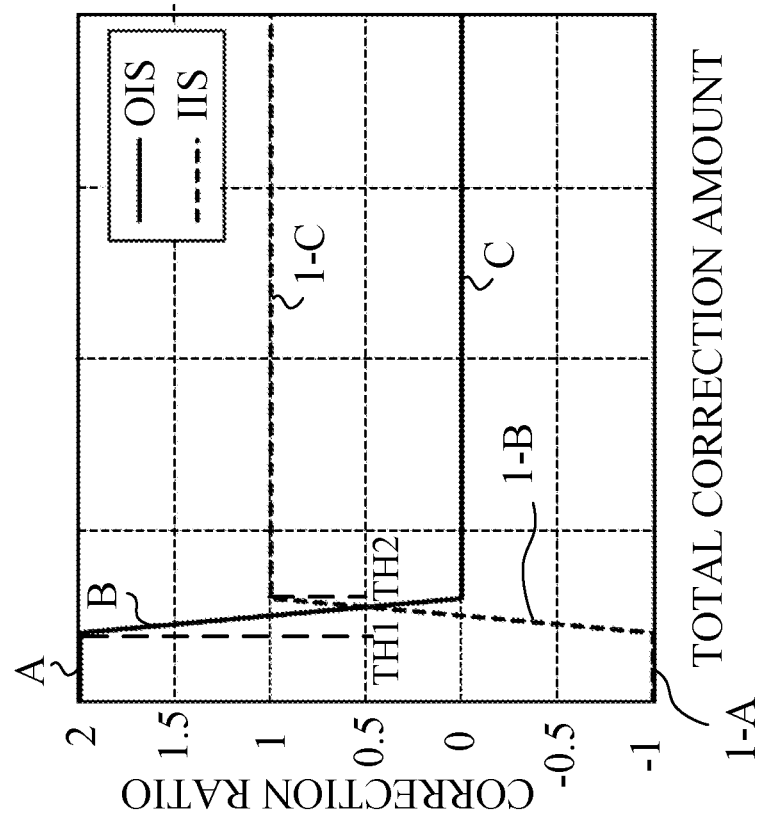

FIGS. 6A and 6B illustrate the OIS correction ratios A, B, and C and the IIS correction ratios (1−A), (1−B), and (1−C) against the image stabilizing amount "a" in this embodiment. A horizontal axis represents the image stabilizing amount (total correction amount) "a" in the entire image stabilizing system, and a vertical axis represents a correction ratio.

Figure 7A:
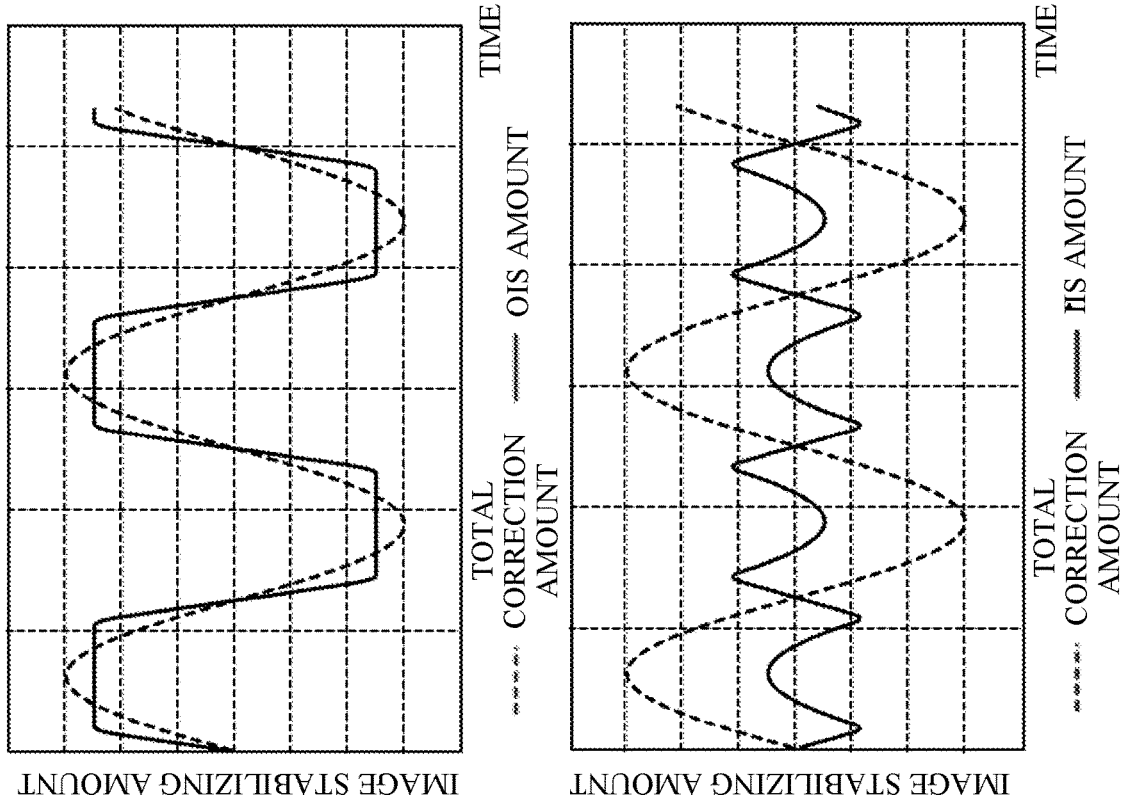
FIGS. 7A and 7B illustrate an IIS amount and an OIS amount against a total correction amount using the correction ratio illustrated in FIGS. 6A and 6B.

FIG. 6A illustrates the OIS correction ratio and the OIS correction ratio in a case where the OIS peripheral correction residue amount Ld and the IIS peripheral correction residue amount Cd have signs opposite to each other, that is, in a case where the image point moving direction in the central portion is different between OIS and IIS. "A" is set by equation (3) and C is set to 0. FIG. 7A illustrates an example of temporal changes in the OIS amount and the IIS amount against the total correction amount "a" in a case where the IIS correction ratio and the IIS correction ratio illustrated in FIG. 6A are used.

Figure 7B:
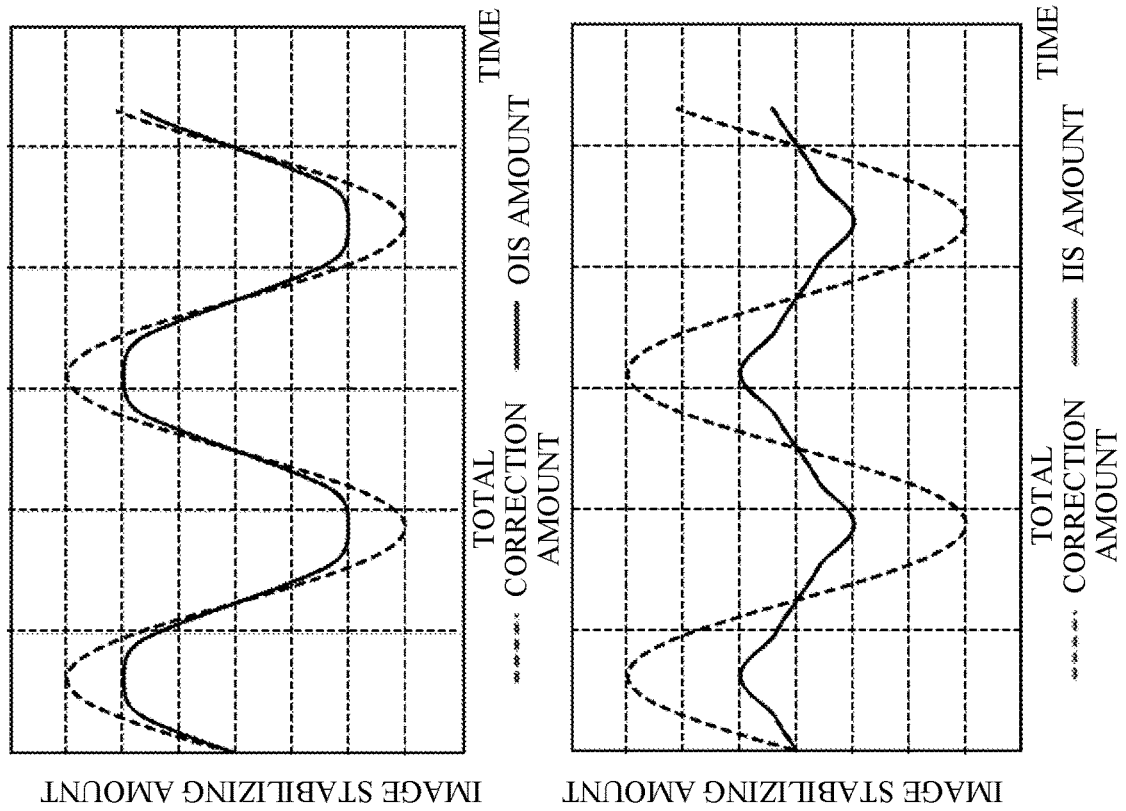

FIG. 6B illustrates the OIS correction ratio and the IIS correction ratio in a case where the OIS peripheral correction residue amount Ld and the IIS peripheral correction residue amount Cd have the same signs, that is, in a case where OIS and IIS have the same image point moving direction in the central portion. "A" is set by equation (3) and C is set to 0. FIG. 7B illustrates an example of temporal changes in the OIS amount and the IIS amount against the total correction amount "a" in a case where the IIS correction ratios A, B, and C and the IIS correction ratios (1−A), (1−B), and (1−C) illustrated in FIG. 6B are used.

Figure 9:
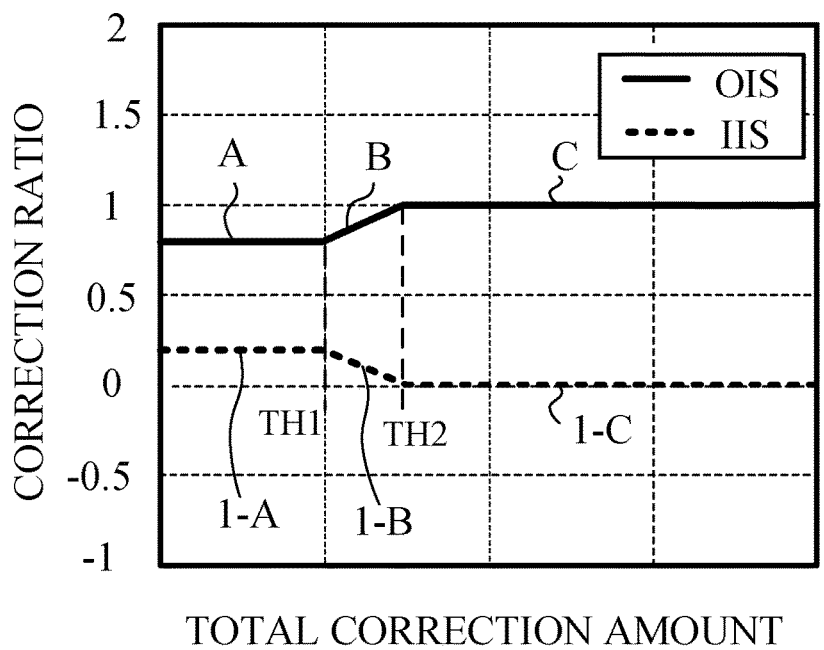
FIG. 9 illustrates another example of a correction ratio between IIS and OIS according to this embodiment.

FIG. 9 illustrates other examples of the OIS correction ratios A, B, and C and the IIS correction ratios (1−A), (1−B), and (1−C) against the image stabilizing amount "a." In this example, the OIS correction ratio A is set according to equation (3) and C is set to 1.

In a case where the image stabilizing amount is smaller than the threshold TH1, this embodiment preferentially uses one of OIS and IIS which has a smaller peripheral correction residue amount and can satisfactorily correct image blur in the central portion and reduce the IS residue amount in the peripheral portion. On the other hand, in a case where the image stabilizing amount is equal to or larger than the threshold TH2, this embodiment preferentially uses one of OIS and IIS which has a larger maximum image stabilizable amount and can more satisfactorily correct image blur in the central portion than the comparative example even when a large shake is applied to the imaging system. In a case where the image stabilizing amount is equal to or larger than the threshold H1 and smaller than TH2, this embodiment gradually changes the correction ratio according to the image stabilizing amount, thereby suppressing abrupt operations of OIS and IIS and stabilizing the controllability.

By switching the OIS and IIS correction ratios according to the detected shake amount, this embodiment can perform proper image stabilization for both small and large shake amounts.

The above embodiment can perform proper image stabilization according to the shake amount using both the first image stabilizing unit (OIS) and the second image stabilizing unit (IIS).

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-038676, filed on Mar. 11, 2022, and No. 2023-022055, filed on Feb. 16, 2023, which are hereby incorporated by reference herein in their entirety.

What is claimed is:

1. A control apparatus configured to control, based on a detected shake amount, driving of a first image stabilizing unit for image stabilization by moving a correction optical system that constitutes at least part of an imaging optical system and a second image stabilizing unit for image stabilization by moving an image sensor configured to capture an object image formed by the imaging optical system, the control apparatus comprising:
   a memory storing instructions; and
   at least one processor that executes the instructions to:
      acquire first information about an image blur residue relative to a moving amount of the correction optical system, second information about an image blur residue relative to a moving amount of the image sensor, third information about a maximum image stabilizable amount of the first image stabilizing unit, and fourth information about a maximum image stabilizable amount of the second image stabilizing unit; and set a correction ratio between the first image stabilizing unit and the second image stabilizing unit by switching between a first ratio and a second ratio according to the shake amount, wherein the first ratio is based on the first information and the second information, and the second ratio is based on the third information and the fourth information.

2. The control apparatus according to claim 1, wherein the at least one processor switches the correction ratio to:

the first ratio in a state where the shake amount is smaller than a first predetermined value, and the second ratio in a state where the shake amount is larger than a second predetermined value that is larger than the first predetermined value.

3. The control apparatus according to claim 2, wherein the at least one processor sets the correction ratio to a third ratio that varies depending on the shake amount between the first ratio and the second ratio in a state where the shake amount is larger than the first predetermined value and smaller than the second predetermined value.

4. The control apparatus according to claim 1, wherein the at least one processor sets the first ratio using:

a first value relating to the image point moving amount at a peripheral image height obtained from the first information; and a second value relating to the image point moving amount at a peripheral image height obtained from the second information.

5. The control apparatus according to claim 4, wherein the first and second values are image stabilization residual amounts.

6. The control apparatus according to claim 4, wherein the at least one processor sets the first ratio using a ratio between the first value and the second value, or a difference between the first value and the second value.

7. The control apparatus according to claim 1, wherein the at least one processor sets the second ratio to drive one of the first image stabilizing unit or the second image stabilizing unit that has a larger maximum image stabilizable amount.

8. A control apparatus configured to control, based on a detected shake amount, driving of a first image stabilizing unit for image stabilization by moving a correction optical system that constitutes at least part of an imaging optical system and a second image stabilizing unit for image stabilization by moving an image sensor configured to capture an object image formed by the imaging optical system, the control apparatus comprising:

a memory storing instructions; and at least one processor that executes the instructions to:

provide image stabilization by switching between, according to the shake amount:

first image stabilizing control configured to move the first image stabilizing unit in an image stabilizing direction and to move the second image stabilizing unit in a direction opposite to the image stabilizing direction, wherein in the first image stabilizing control:

the first image stabilizing unit is moved by a moving amount larger than a moving amount of the first image stabilizing unit for image stabilization against the shake amount only with the first image stabilizing unit; and second image stabilizing control configured to move the first image stabilizing unit and the second image stabilizing unit in the image stabilizing correcting direction.

9. An optical apparatus comprising the control apparatus according to claim 1.

10. An optical apparatus comprising the control apparatus according to claim 8.

11. A control method configured to control, based on a detected shake amount, driving of a first image stabilizing unit for image stabilization by moving a correction optical system that constitutes at least part of an imaging optical system and a second image stabilizing unit for image stabilization by moving an image sensor configured to capture an object image formed by the imaging optical system, the control method comprising the steps of:

acquiring first information about an image blur residue relative to a moving amount of the correction optical system, second information about an image blur residue relative to a moving amount of the image sensor, third information about a maximum image stabilizable amount of the first image stabilizing unit, and fourth information about a maximum image stabilizable amount of the second image stabilizing unit; and setting a correction ratio between the first image stabilizing unit and the second image stabilizing unit by switching between a first ratio and a second ratio according to the shake amount, wherein:

the first ratio is based on the first information and the second information, and the second ratio is based on the third information and the fourth information.

12. A non-transitory computer-readable storage medium storing a program executable by a computer to execute the control method according to claim 11.

* * * * *